United States Patent [19]

Hanna

[11] Patent Number: 4,921,279
[45] Date of Patent: May 1, 1990

[54] MICR PRINTING TECHNIQUE AND APPARATUS TO MINIMIZE REJECTS WITH CORRECTION STICKERS

[75] Inventor: Peter D. Hanna, Waterloo, Canada

[73] Assignee: NCR Corporation, Dayton, Ohio

[21] Appl. No.: 234,236

[22] Filed: Aug. 18, 1988

[51] Int. Cl.$^5$ ............................................... B42D 15/00
[52] U.S. Cl. ...................................... 283/67; 283/58; 283/82
[58] Field of Search ...................... 283/67, 58, 82, 117

[56] References Cited

U.S. PATENT DOCUMENTS

| | | | |
|---|---|---|---|
| 3,229,650 | 12/1966 | Buros | 283/58 X |
| 3,692,298 | 9/1972 | Peacock | 283/58 X |
| 3,702,924 | 11/1972 | Wood et al. | 283/58 X |

Primary Examiner—Paul A. Bell
Attorney, Agent, or Firm—Wilbert Hawk, Jr.; Albert L. Sessler, Jr.; Elmer Wargo

[57] ABSTRACT

A method and apparatus for minimizing rejections when using correction stickers on documents which are to be read by a single channel or "deep" MICR read head in subsequent reading operations. The method entails printing the correct MICR data on the correction sticker (which is placed over the incorrect MICR data) so that the correct MICR data is purposely off registration with the incorrect MICR data underneath the correction sticker so that the correct MICR data on the correction sticker will be encountered by a read head before the incorrect MICR data underneath the correction sticker is encountered. A double printing of the correct MICR data on the correction sticker also causes dynamic thresholding circuits associated with common MICR readers to "key in" on the high signal level on the MICR ink on the correction sticker and thereby render the incorrect MICR data signal underneath the correction sticker to the level of "noise".

22 Claims, 2 Drawing Sheets

FEEDING DIRECTION

FEEDING DIRECTION

MICR PRINTING TECHNIQUE AND APPARATUS TO MINIMIZE REJECTS WITH CORRECTION STICKERS

BACKGROUND OF THE INVENTION

This invention relates to a process and apparatus for minimizing rejections by document processing equipment when using correction stickers to correct incorrectly printed MICR data on documents.

In the check processing industry, for example, checks and other financial documents have intelligence data printed thereon in magnetic ink. The intelligence data relates to bank number, account number, transaction codes, and monetary amount, for example, and this data is referred to as MICR data.

In order to read the MICR data, the document with the MICR data thereon is moved in operative relationship with a magnetic read head. Generally, there are two types of read heads used. The first type is referred to as a "deep" MICR reader, and the cons a "shallow" or "matrix" read head.

The deep MICR reader referred to is a single channel read head for spanning the vertical height of the associated MICR clear band as the MICR characters on a document are moved in a horizontal direction, for example, past the reader. As a typical illustration, such a read head may have a relatively wide gap (about 0.002 inch) and may be able to detect flux changes of the magnetized MICR ink up to a distance of 0.010 inch from the read head.

In contrast, a shallow or matrix read head may have 30 channels or tracks in the head spanning the MICR band, with six or seven of the tracks being exposed to the vertical height of the character being read. Each of the tracks has an individual read head element with a very small head gap therein which can detect flux changes for only a very short distance from the read head. Matrix read heads are much more expensive than deep read heads.

When errors are made in entering the monetary amounts on checks on a proof encoding machine, for example, the procedure used for correcting the errors is generally dependent upon the particular type of reader used for subsequent data capture.

When a shallow reader of the type described is used, a correction sticker is used, commonly, in the error correction process. The correction sticker generally is made of white paper (often with foil backing), has adhesive on one side thereof, and is generally about 7/16 × 1¾ inches in size. In correcting the monetary amount encoded in MICR ink on a document or check, the correction sticker is applied to the check to cover the incorrect monetary amount thereon, and thereafter, the check is processed by an encoder, for example, to have the correct monetary amount encoded or printed on the correction sticker.

The correction sticker generally works well with shallow readers because these readers do not "read through" the correction sticker to be influenced by the incorrect MICR data appearing on the document underneath the sticker; the shallow readers are relatively immune from rejects from this cause. In other words, the shallow readers read only the correct MICR data which appears on the top of the correction sticker.

The shallow readers, however, are not without problems. For example, when MICR data is printed on a document, a "cavity" is produced on the front side of the document due to the printing, and, correspondingly, an embossment is produced on the back side of the document. The MICR ink for the character being printed is deposited in the cavity on the front side of the document. Because the MICR ink for a character lies in the cavity, the shallow read head may not be close enough to the MICR ink, and consequently, a reject may occur. The shallow readers, however, tend to read only the MICR data printed or encoded on the correction sticker.

In contrast, the deep readers tend to read the correct MICR data on the correction sticker and also tend to be influenced by the incorrect MICR data on the document underneath, and consequently, both the correct MICR data on the correction sticker and the incorrect MICR data on the document are "read", causing the document to be rejected as improperly read. The ensuing extra processing and correction procedures are time consuming and expensive for financial institutions, for example.

In an attempt to generally improve correction stickers and to overcome the problem mentioned in the previous paragraph with regard to deep readers and correction stickers, the correction stickers have been redesigned by current suppliers in the industry to include a backing of aluminum foil. Unfortunately, reject rates of up to 90% still persist on deep readers when using the foil-backed stickers. Also, when the correction stickers are made thicker to move the incorrect data on the check out of the range of the deep reader, the thicker correction stickers cause document transport jams, and consequently, are not used.

Today, the common industry approach to solving the correction procedure with deep readers is to use a liquid solvent eradicator for corrections. The eradicator works to remove the magnetic ink associated with the incorrect amount or entry on the document. However, even when the eradicator removes all but a trace of the unwanted MICR ink, as seen by the human eye, for example, there is still a reject rate of about 25 to 30 percent when the correct MICR data is encoded over the eradicated area. This is due to a remanent signal coming from the MICR ink remaining on the document. Also, the use of certain of the liquid solvent eradicators is considered a health hazard by some people. Some countries ban the use of such eradicators.

SUMMARY OF THE INVENTION

In contrast with the problems previously discussed, the present invention provides a way of printing MICR characters on correction stickers in such a way as to minimize rejects which occur when using deep readers of the type discussed earlier herein.

The use of this invention will also permit the universal use of correction stickers by proof machine operators for correcting MICR printing errors regardless of the type of reader used for subsequent data capture.

The use of this invention will also permit the phasing out of objectionable liquid eradicators.

In one aspect of a preferred embodiment of the invention, there is provided a method of correcting MICR data on a document comprising the steps of:

(a) placing a correction sticker on the document over the MICR data to be corrected;

(b) positioning the document and a printer relative to each other so that the MICR data to be printed on the correction sticker will be purposely off registration when compared to the MICR data on the document under the correction sticker so as to enable the MICR data printed on the correction sticker to encounter a read head in a subsequent reading operation prior to the MICR data to be corrected on the document; and (c) printing the correct MICR data on the correction sticker while positioning the document according to step b.

In another aspect of a preferred embodiment of the invention, there is provided a method of correcting MICR data encoded on a document with magnetic ink having a predetermined intensity, comprising the steps of:

(a) placing a correction sticker on the document over the MICR data to be corrected; and (b) printing the correct MICR data on the correction sticker with magnetic ink having an intensity which is substantially greater than said predetermined intensity.

In another aspect of a preferred embodiment of the invention, there is provided an article comprising:

a medium having MICR printing thereon;

a correction sticker secured over said MICR printing on said medium;

said correction sticker having MICR printing thereon;

said MICR printing on said correction sticker being printed thereon so as to be purposely off register with the MICR printing on said medium so that at a subsequent reading operation, the MICR printing on said correction sticker encounters a MICR read head prior to the MICR printing on said medium.

In still another aspect of of a preferred embodiment of the invention, there is provided a system for correcting MICR printing on a document comprising:

a print station;

means for moving a document with a correction sticker over the MICR printing to be corrected to said print station; and printing means including a printer for printing correct MICR printing on said correction sticker so that the MICR printing on said correction sticker is purposely off registration when compared to the MICR printing on the document under the correction sticker so as to enable the MICR printing on said correction sticker to encounter a MICR read head in a subsequent reading operation prior to the MICR printing on said document.

The advantages and features mentioned will be more readily understood in connection with the following specification, claims, and drawing.

DESCRIPTION OF THE PREFERRED EMBODIMENTS

Figure 1:
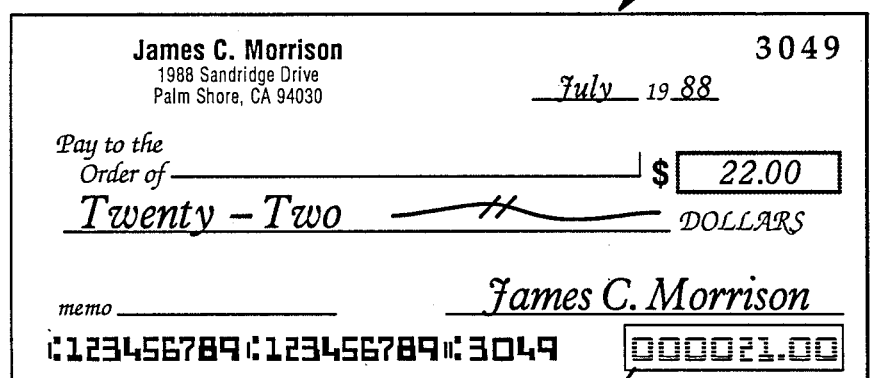
FIG. 1 is a plan view of a document, like a check, which may be used to illustrate this invention, with the check having a correction sticker thereon so as to cover incorrect MICR data on the check.

Before proceeding with a discussion of the invention, it appears useful to describe how the correction stickers mentioned earlier herein are utilized. In this regard, FIG. 1 shows a typical document, like a check 10, which has MICR data such as account number, bank number, and check number, for example, appearing under the MEMO line on the check 10. After a check 10 is presented to a bank for payment, the monetary amount of the check 10 is encoded or printed on the check 10 under the signature line thereon as part of a normal check processing procedure. The name James C. Morrison appearing on the signature line is fictitious as is all the data appearing on the check 10.

In the example being described, the correct monetary amount of the check is $22.00; however, when the check 10 was processed by an operator, the amount of $21.00 was entered instead of the correct $22.00. When the monetary amount of the check 10 was encoded or printed on the check 10 by an apparatus similar to that shown in FIG. 4, for example, the amount of $21.00 was encoded in MICR characters. This $21.00 figure appears in dashed outline under the signature line because FIG. 1 also shows a correction sticker 12 which is positioned over the incorrect MICR data on the check 10. The correction sticker 12, as described under the Background Of The Invention, was placed over the incorrect MICR data after it was discovered that this particular check 10 had the incorrect monetary amount thereon.

Figure 4:
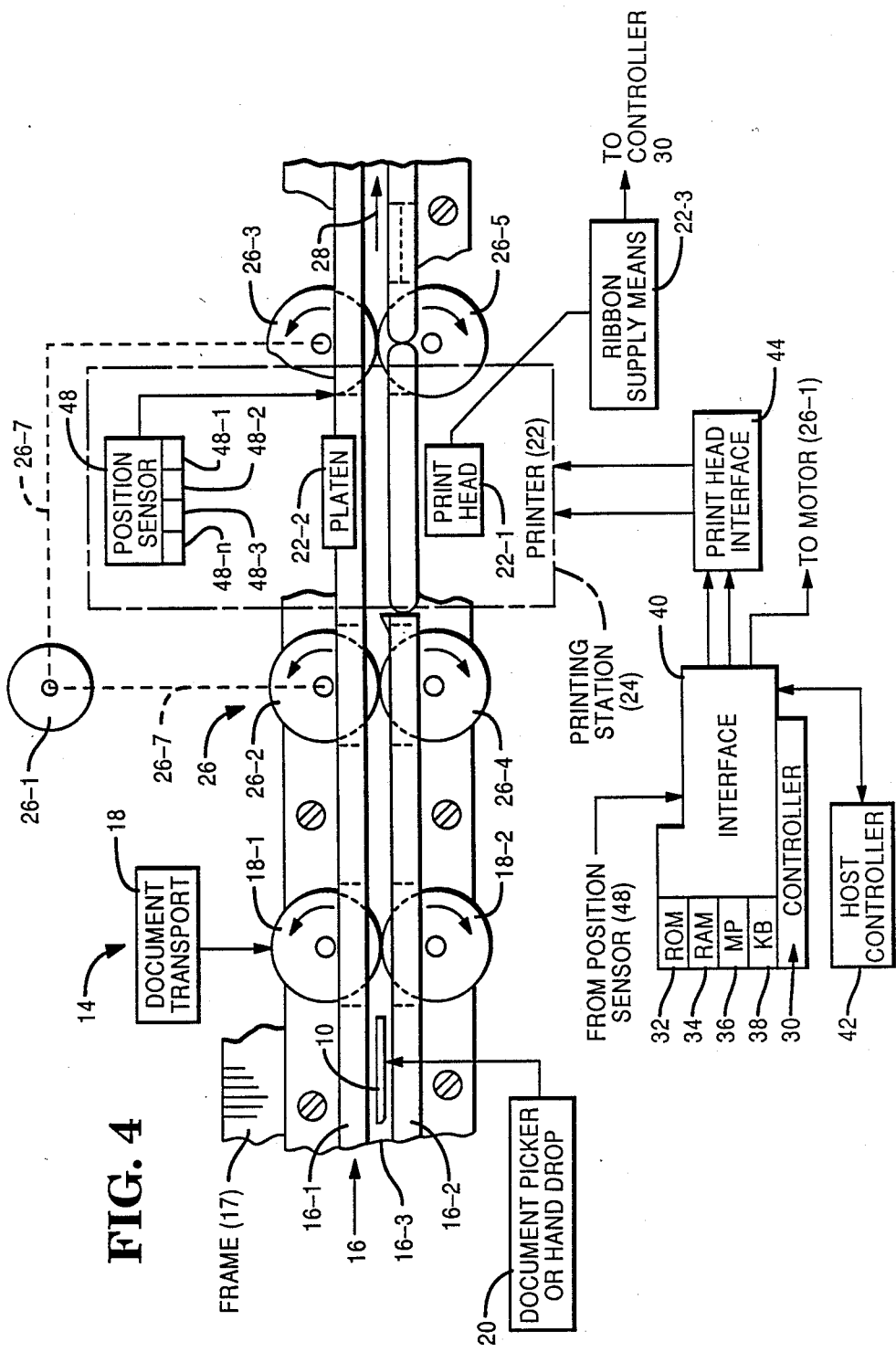
FIG. 4 is a plan view, in diagrammatic form, showing a portion of a business machine, like an encoder, which may be used to encode or print MICR data on a correction sticker which is used to cover incorrect MICR data on the document itself.

After the correction sticker 12 is placed over the incorrect MICR data on the check 10, the check 10 is processed in a business machine like an encoder 14 shown in FIG. 4. Before discussing the method of correcting MICR data on a document, like a check 10, according to this invention, it is useful to discuss the nature of the encoder 14.

FIG. 4 is a plan view of the encoder 14 which is used to encode or print the monetary amount of the check in MICR characters or data. The encoder 14 has a document track 16 which includes the vertically upstanding side walls 16-1 and 16-2 and also includes the bottom 16-3 which are mounted in a frame shown schematically as 17. The encoder 14 also includes a conventional document transport 18 which is used to move the documents between the sidewalls 16-1 and 16-2 and the bottom 16-3 of the document track 16. The documents, like check 10, are placed in the document track 16 by a conventional picker 20 or by an operator at a hand drop area, for example, so that the top edge of the check 10 is viewed in FIG. 4, and the front of the check 10 faces the print head 22-1 of the printer 22 located at the printing station 24. The document transport 18 is conventional, and is shown only diagrammatically as drive roller 18-1 and pinch roller 18-2. The document transport 18 moves a document from the document picker 20 to the printing station 24.

As a document, like check 10, approaches the printing station 24, it encounters a second transport means 26 for positioning the document at the printing station 24. The second transport means 26 includes the stepping motor 26-1, the drive rollers 26-2 and 26-3, and their associated pinch rollers 26-4 and 26-5, respectively. The drive rollers 26-2 and 26-3 and their associated pinch rollers 26-4 and 26-5 are referred to as hard drive rollers, while the drive roller 18-1 and its associated pinch roller 18-2 are referred to as soft drive rollers. Hard drive rollers have a higher coefficient of friction than soft drive rollers. As applied to the encoder 14, this means that as a document, like check 10, approaches the printing station 24, the second transport means 26 controls the movement of the check 10 relative to the printer 22 while the soft drive rollers attempt to move the check 10 but do not move it because the soft drive roller 18-1 merely "slips" on the document. After a document is encoded under the correction procedure of this invention, it is moved in the feeding direction shown by arrow 28 to other portions of the encoder 14 which are not important to an understanding of this invention.

Figure 2:
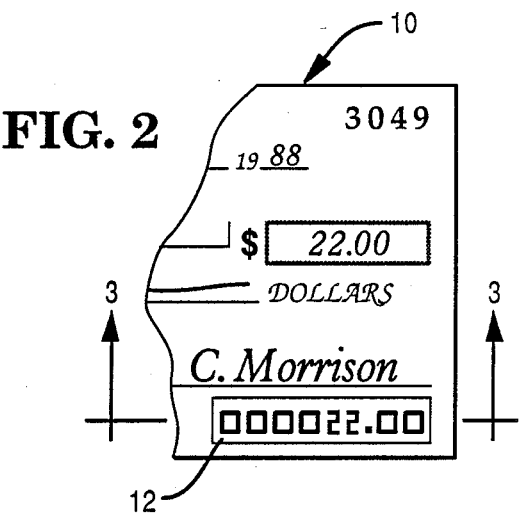
FIG. 2 is a plan view, similar to FIG. 1, showing the correction sticker having the correct MICR data encoded thereon.

The encoder 14 also has a controller 30 which is used to control the operation of the encoder 14. The controller 30 includes a ROM 32, a RAM 34, a microprocessor (MP) 36, a keyboard (KB) 38, and an interface 40 which is used couple the various elements shown. The controller 30 is conventional and its actual form may be different from that shown in FIG. 4; however, the controller 30 is shown in a form which illustrates the functions associated with this invention. The controller 30 may also be coupled to a host controller 42 in the encoder 14, although the host controller 42 is not absolutely necessary for the encoder 14. The controller 30 also controls the print head interface 44 which controls the print head 22-1 so as to print the desired MICR data on the check 10 during the normal processing of a check and to also print MICR data on the correction sticker 12 (FIG. 2) as will be described hereinafter.

Figure 3:
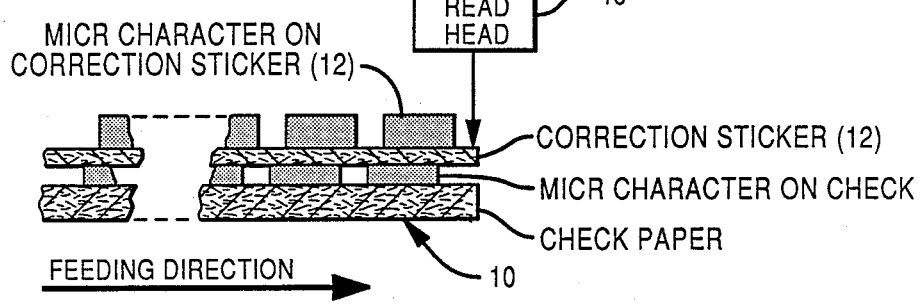
FIG. 3 is a cross sectional view, taken along the line 3—3 of FIG. 2, to show how the MICR characters on the correction sticker are off registration with regard to the incorrect MICR characters on the document itself; the characters and thickness of the document and the correction sticker are shown greatly exaggerated in size so as to facilitate their showing.

The method of minimizing rejections when using correction stickers according to this invention includes the step of printing the correct MICR data on the correction sticker 12 so that the correct MICR data on the correction sticker 12 is purposely out of registration or register (as shown in FIG. 3) with the incorrect MICR data which appears on the document or check 10. The printing out of register is effected so that the MICR data on the correction sticker 12 leads or is ahead of the MICR data on the check when considering the feeding direction of the check 10 when it encounters a read head 46 in another business machine like a reader/sorter, for example.

Printing the MICR data on the correction sticker 12 out of register with the incorrect data appearing on the check 10 is effected on a business machine like the encoder 14 shown in FIG. 4. In addition to what has already been described in relation to the encoder 14, the encoder 14 also includes a position sensor 48 which is used to locate the leading edge of the check 10 relative to the print head 22-1. In some situations, it may be more convenient to move the print head 22-1 relative to the check 10. What is important is to provide relative movement between the check 10 and the print head 22-1 so as to enable the print head 22-1 to print the MICR characters on the correction sticker 12 out of register with the characters under the correction sticker 12 on the document or check 10.

The position sensor 48 (FIG. 4) is conventional and may be comprised of a plurality of individual sensors which are marked as 48-1, 48-2, 48-3, through 48-n. There may be a light source (not shown) on the opposite side of the document track 16 which is directed at the position sensor 48 so that at any time, the particular sensors, like 48-n, 48-3, etc., which are covered or blocked by a document or check 10 in the document track 16 and those which are unblocked are utilized by the controller 30 to accurately determine the location of the leading edge of the document or check 10 at the printing station 24. The stepping motor 26-1 is energized by the controller 30 for bi-directional rotation so as to accurately position the check 10 to effect the printing as described. In addition, the stepping motor 26-1 is coupled to the drive rollers 26-2 and 26-3 by suitable linkage, shown as dashed lines 26-7, to effect the necessary incremental movement of the check 10 relative to the print head 22-1.

The amount of incremental movement necessary to effect the off-registration or a change in registration between the correct MICR data on the correction sticker 12 relative to the incorrect data which appears on the check 10 is dependent upon the particular MICR data being printed or encoded. The present invention may be used for MICR data which is printed in E13B or CMC7 fonts, for example. When data is to be printed in E13B font, for example, the amount of off-registration mentioned is about 0.0065 to 0.0130 inch for the current readers; this value represents the basic width of a bar used in the font design. Each character within the E13B font fits into a cell of ⅛ inch in width as measured from the leading edge of one character to the leading edge of the next successive character.

The controller 30 (FIG. 4) has software routines located in its ROM 32 or RAM 34 for positioning the leading edge of a document at the printing station 24 to effect the off registration discussed in the previous paragraph. The controller 30 receives the output from the position sensor 48, and determines where the leading edge of the document or check 10 is located. The controller 30 then determines which way and how much the stepping motor 26-1 is to be rotated to position the check 10 to effect the printing on the correction sticker 12 as described.

When the printing or encoding is effected as described in relation to FIG. 3, a subsequent read head 46 by which the document or check 10 is read, will key in on the MICR characters encoded on the correction sticker 12 instead of keying in on the incorrect MICR characters on the check 10. In other words, the logic circuitry associated with the read head 46 looks for a "character start" event which causes the reading algorithms associated with the read head 46 to synchronize with the analog signature of the MICR characters on the correction sticker 12 and to be less likely to "see" the features of the MICR characters on the check 10 itself.

While shifting the printing on the correction sticker 12 relative to the printing on the document itself provides an improvement in the number of rejects when reading the MICR data on correction stickers, a further improvement in reading is also effected when the printing on the correction sticker has an ink intensity which is substantially greater than the ink intensity of the incorrect MICR characters under the correction sticker. The increased ink intensity may be effected through the use of a special ribbon containing magnetic ink of an increased ink intensity when compared to the usual magnetic ink used, or a double printing may be effected while using a ribbon containing ink of the usual intensity.

When the MICR data on the correction sticker 12 is double printed, a signal level which is approximately 180% of single printing is generated. This high level signal causes the logic circuitry associated with the read head 46 (FIG. 3) to consider the signals resulting from the incorrect MICR data underneath the correction sticker 12 as "noise". When double printing as described is used alone, adding the off or out of registration printing also tends to complement the double printing to reduce the rejection rate.

To repeat, the double printing and the out of registration printing, as described, tend to complement each other to reduce the reject rate when using correction stickers with deep readers. For example, when using a parallel printer for printing E13B font twice on a correction sticker and when using the out of registration printing according to this invention, the normal reject rate of up to 90%-100% falls to approximately 15%. Proportionately good results are achieved with CMC7 font.

The double printing alluded to in the previous paragraph may be effected by a parallel type thermal printer of the type shown in U.S. Pat. No. 4,394,092 which issued on June 19, 1983 and is assigned to the same assignee as is this invention. In printing, it is important that the second impression of printing be located directly on top of the first impression. The drive rollers 26-2 and 26-3 of the second transport means 26 also perform the function of holding the check 10 stationary while the first and second impressions of printing are made. With the printer mentioned in the named patent, all the MICR characters to be printed on the document or check 10 are printed in parallel while being retained in position between the print head 22-1 and the associated platen 22-2 by the drive rollers 26-2 and 26-3. After the first printing or impression is made, the second impression is similarly made directly on top of the first impression.

The print head 22-1 and the associated platen 22-2 are shown schematically in FIG. 4 to illustrate that the printing can be effected by both parallel and serial printers. When serial printers are used, it is necessary to hold the document or check 10 while the first and second impressions are made. Thereafter, the document is indexed or moved in the direction of arrow 28, in the example being described, to bring the next character to be printed into the off registration position as previously described. Then, the correct MICR character is printed twice. This procedure is repeated for the remaining characters to be printed on the correction sticker 12.

The software associated with the controller 30 enables the printer 22 to selectively determine the intensity of the encoding or printing. In this regard, the encoder 14 can print with a single or normal intensity level of printing, or the encoder 14 can print twice on a correction sticker 12, as described, to increase the intensity level on the correction sticker 12. As previously stated, the increased intensity level on the correction sticker 12 minimizes the relative strength of the incorrect MICR data underneath the correction sticker 12 on the document or check 10. When an operator wishes the encoder to be put into the "correction mode", the operator simply actuates a predetermined key on the keyboard 38 (FIG. 4) to place the encoder 14 in that mode.

In the embodiment described, the double printing by the encoder 14 has the same effect as a conventional 180% magnetic ink ribbon which provides (with a single impression) a character signal strength which is 180% of the normal signal strength. In the embodiment described, a conventional 100% magnetic ink ribbon is used for the single-impression, normal printing on the document or check 10, and a double impression with the same ribbon is used on the correction sticker 12. In other words, the double impression puts more magnetic oxide in the strata of the printed character to impart a stronger signal to the read head 46. It is important that the two impressions of printing be superimposed so that no increase in the width of the bars used in character formation occurs. It is especially important that the vertical edges of the document be sharp. Using more than two impressions or printings on the correction sticker 12 increases the effect described more than does two impressions; however, the increased number of impressions above two does not appear to be essential.

A conventional ribbon supply means 22-3 for shifting first and second MICR ink ribbons to the print head 22-1 may be used to effect printing on the check 10 and the correction sticker 12. For example, the first ribbon may be a conventional 100% magnetic ink ribbon for printing on the check 10, and the second ribbon may be a conventional 180% ribbon for printing on the correction sticker with a single impression instead of two impressions as discussed earlier herein. The shifting of the ribbon supply means 22-3 is controlled by the controller 42.

As previously stated, the reject rate when using correction stickers with deep MICR readers according to prior art techniques is about 90%. With this invention, the reject rate with correction stickers and a deep MI*CR reader is about 15%. The improved rejection rate with this invention applies equally well the E13B font which is used in the U.S.A., for example, and the CMC7 font which is used in Europe, for example. The selection printing capability described can be incorporated into the various existing encoders. Incorporation of this feature will permit the phasing out of the volatile and messy liquid eradicators mentioned earlier herein, and it will also reduce the rejection rates as described.

What is claimed is:

1. A method of correcting MICR data encoded on a document with magnetic ink having a predetermined intensity, comprising the steps of:
   (a) placing a correction sticker on the document over the MICR data to be corrected; and
   (b) purposely printing the correct MICR data on the correction sticker with magnetic ink having an intensity which is substantially greater than said predetermined intensity.

2. The method as claimed in claim 1 in which said printing step is effected by printing the correct MICR data on the correction sticker at least twice.

3. The method as claimed in claim 2 in which said printing step is effected by:
   (b-1) positioning the document with the correction sticker thereon and a printer relative to each other so that the correct MICR data to be printed on the correction sticker will be purposely off registration when compared to the MICR data on the document under the correction sticker so as to enable the correct MICR data printed on the correction sticker to encounter a read head in a subsequent reading operation prior to the MICR data to be corrected on the document.

4. The method as claimed in claim 1 in which said printing step is effected by utilizing a ribbon whose magnetic ink has an ink intensity which is substantially greater than said predetermined intensity.

5. The method as claimed in claim 4 in which said printing step b is effected by:
   (b-1) positioning the document with the correction sticker thereon and a printer relative to each other so that the correct MICR data to be printed on the correction sticker will be purposely off registration when compared to the MICR data on the document under the correction sticker so as to enable the correct MICR data printed on the correction sticker to encounter a read head in a subsequent reading operation prior to the MICR data to be corrected on the document.

6. A method of correcting MICR data on a document comprising the steps of:
   (a) placing a correction sticker on the document over the MICR data to be corrected;
   (b) positioning the document and a printer relative to each other so that the MICR data to be printed on the correction sticker will be purposely off registration when compared to the MICR data on the document under the correction sticker so as to enable the MICR data printed on the correction sticker to encounter a read head in a subsequent reading operation prior to the MICR data to be corrected on the document; and
   (c) printing the correct MICR data on the correction sticker while positioning the document according to step b.

7. The method as claimed in claim 6 in which said printing is effected by printing the MICR data on the correction sticker at least twice while positioning the document according to step b.

8. The method as claimed in claim 6 in which said positioning step is effected by using a stepping motor.

9. A method of printing MICR characters on a correction sticker which covers MICR characters to be corrected on a document comprising the steps:
   (a) moving the document with the correction sticker thereon in a feeding direction to a print station;
   (b) positioning the document at the print station so that the leading edge of the document is positioned upstream by a predetermined amount, relative to the feeding direction, from the position that the document occupied when the characters under the correction sticker were printed; and
   (c) printing the desired MICR characters at least twice on the correction sticker.

10. The method as claimed in claim 9 in which said positioning step is effected by using a stepping motor while correlating said predetermined amount to the width of vertical bars used in the printing of said MICR characters.

11. A method of correcting the MICR characters used in the monetary amount printed on a financial document, comprising the steps of:
    (a) placing a correction sticker on the financial document over the MICR characters used in the monetary amount to be corrected;
    (b) moving the financial document with the correction sticker thereon to a print station; and
    (c) using a printer at the print station for printing the correct MICR characters for the monetary amount on the correction sticker so as to be purposely off register by a predetermined amount relative to the MICR characters for the monetary amount on the financial document so as to enable the correct MICR characters for the monetary amount printed on the correction sticker to encounter a MICR read head in a subsequent reading operation prior to the MICR characters for the monetary amount on the financial document.

12. The method as claimed in claim 11 in which said using step is effected while correlating said predetermined amount to the width of vertical bars used in the printing of said MICR characters.

13. The method as claimed in claim 12 in which said using step is effected by printing the correct MICR characters at least twice for the monetary amount on the correction sticker.

14. The method as claimed in claim 13 in which said printing is effected by printing all the MICR characters for the monetary amount on the correction sticker at approximately the same time through using a parallel type printer.

15. An article comprising:
    a medium having MICR printing thereon;
    a correction sticker secured over said MICR printing on said medium;
    said correction sticker having MICR printing thereon;
    said MICR printing on said correction sticker being printed thereon so as to be purposely off registration with the MICR printing on said medium and underneath said correction sticker so that at a subsequent reading operation, the MICR printing on said correction sticker encounters a MICR read head prior to the MICR printing on said medium and under said correction sticker.

16. The article as claimed in claim 15 in which said MICR printing on said correction sticker has an intensity which is greater than the MICR printing on said medium and under said correction sticker.

17. The article as claimed in claim 16 in which said medium is a financial document.

18. The article as claimed in claim 17 in which said MICR printing on said correction sticker is about 180% as intense as the MICR printing on said document.

19. A system for correcting MICR printing on a document comprising:
    a print station; ( means for moving a document having a correction sticker positioned over the MICR printing to be corrected to said print station; and
    printing means including a printer for printing correct MICR printing on said correction sticker so that the MICR printing on said correction sticker is purposely off registration when compared to the MICR printing on the document under the correction sticker so as to enable the MICR printing on said correction sticker to encounter a MICR read head in a subsequent reading operation prior to the MICR printing on said document.

20. The system as claimed in claim 19 in which said printing means includes a controller for controlling said printer to selectively print more than one impression on said correction sticker and in which said printer is a serial type printer.

21. The system as claimed in claim 19 in which said printing means includes a controller for controlling said printer to selectively print more than one impression on said correction sticker and in which said printer is a parallel type thermal printer for printing in E13B and CMCs7 fonts.

22. The system as claimed in claim 19 in which said MICR printing on the document is effected by a magnetic ink having a predetermined ink intensity and in which said printing means includes a ribbon supply means for supplying to said printer a magnetic ink whose intensity is substantially greater than said predetermined ink intensity when said printer is printing said correct MICR printing on said correction sticker.

* * * * *